US011954622B2

United States Patent
Berg et al.

(10) Patent No.: US 11,954,622 B2
(45) Date of Patent: Apr. 9, 2024

(54) INTERACTIVE PROCESS GRAPH FOR MULTI-UI PROCESS

(71) Applicant: SAP SE, Walldorf (DE)

(72) Inventors: Gregor Berg, Berlin (DE); Andre Wenz, Berlin (DE); Sushovan Chattaraj, Berlin (DE); Lukas Egger, Berlin (DE); Bernhard Hoeppner, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/577,751

(22) Filed: Jan. 18, 2022

(65) Prior Publication Data
US 2023/0229996 A1    Jul. 20, 2023

(51) Int. Cl.
*G06Q 10/06* (2023.01)
*G06Q 10/0631* (2023.01)
*G06Q 30/04* (2012.01)

(52) U.S. Cl.
CPC ....... *G06Q 10/06313* (2013.01); *G06Q 30/04* (2013.01)

(58) Field of Classification Search
None
See application file for complete search history.

(56) References Cited

U.S. PATENT DOCUMENTS

| 2007/0162903 A1* | 7/2007 | Babb, II | G06F 8/75 |
| | | | 717/154 |
| 2020/0104402 A1* | 4/2020 | Burnett | G06F 16/2477 |
| 2022/0300417 A1* | 9/2022 | Hajewski | G06F 16/24568 |

OTHER PUBLICATIONS

Vieira et al. (Automation of GUI Testing Using a Model-Driven Approach, AST '06: Proceedings of the 2006 International workshop on Automation of Software test, May 2006, pp. 9-14).*

\* cited by examiner

*Primary Examiner* — Matthew D Henry
(74) *Attorney, Agent, or Firm* — Buckley, Maschoff & Talwalkar LLC

(57) ABSTRACT

Provided are systems and methods for creating and managing an interactive process graphs which expedite performance of a multi-user enterprise process between user interfaces and the underlying systems. In one example, a method may include generating a process graph of a user interface process, wherein the process graph comprises nodes corresponding to activities and vertices between the nodes identifying dependencies among the activities, embedding input fields in the nodes of the process graph, embedding, via the process graph, an identifier of a current location of a data object within an instance within the user interface process, and displaying an instance of the process graph corresponding to the instance of the user interface process which includes the embedded input fields in the nodes and the identifier of the current location of the data object within the instance of the user interface process.

20 Claims, 12 Drawing Sheets

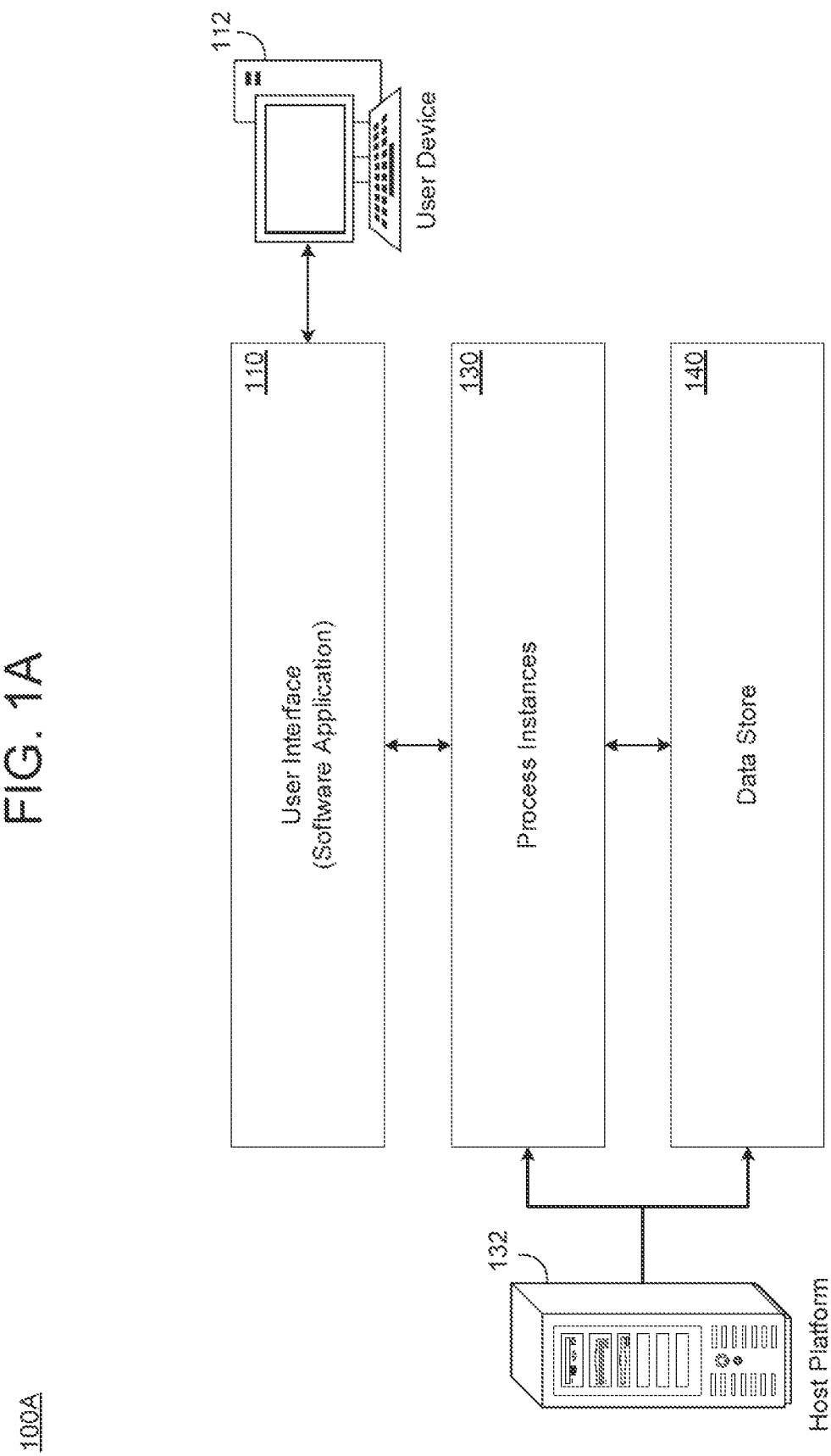

INTERACTIVE PROCESS GRAPH FOR MULTI-UI PROCESS

BACKGROUND

Users who are engaged in a complex business process often access a data object (e.g., a document, record, storage entry, etc.) via various systems and user interfaces in order to access the necessary functionality required to perform a task associated with the data object. As an example, during its lifetime, an invoice may pass through various parties (e.g., seller, buyer, third-party accountant, etc.) and systems (e.g., software applications, services, etc.). The user interfaces of these systems can be quite complex because they are often multi-purpose Enterprise Resource Planning (ERP) tools that provide functionality for many different use cases to be performed. For example, the user interfaces may be used to check and manipulate hundreds of database fields of the business object in a backend system of the business process such as a host server or data store dedicated to a software application, etc.

Intelligent solutions such as bots (e.g., automated software programs that performs repetitive tasks on a user interface, etc.) can simplify ERP systems to reduce loading times, redundancies, and user involvement in general. For example, a bot may be programmed to automatically enter data into fields of a user interface in place of an end user performing the same task. For a process that involves multiple underlying systems and corresponding user interfaces, the problem becomes worse because the end user must open the user interfaces for accessing and interacting with these different systems.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1A is a diagram illustrating a computing architecture for interacting with data and processes via a user interface in accordance with an example embodiment.

DETAILED DESCRIPTION

Figure 1B:
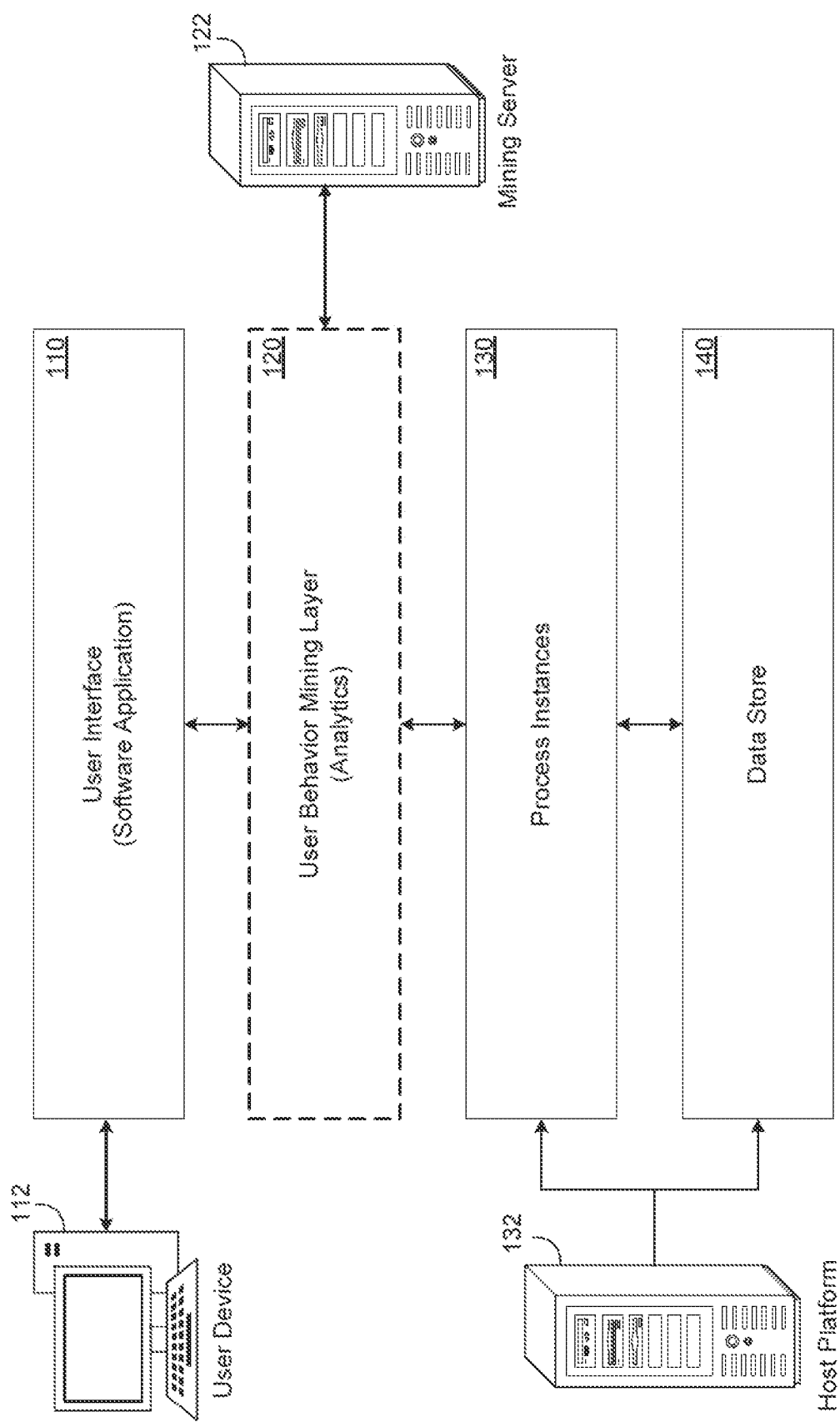
FIG. 1B is a diagram illustrating a computing architecture for mining user behavior in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Robotic processing automation (RPA) has gained attention for its ability to create bot programs that can perform automated user interface actions on a user interface of a software application (e.g., a GUI-based application, etc.) in place of a user. For example, a bot program can automatically read data, enter data, submit data, click on boxes and buttons, make other selections, open pages, click on links, log into underlying data systems such as Enterprise Resource Planning (ERP) systems, and the like.

As an example, RPA may be used to create a software bot to automate repetitive manual-based data entry processes that are performed on a graphical user interface (GUI). For example, a process of a user entering data values into fields of the GUI may be replaced with an automated bot program that takes the data from a source (e.g., an underlying system, an input, etc.) and stores it into the fields of the user interface. That is, rather than a human reading data from a source or multiple sources and entering them into fields of a user interface, a bot can be programmed to perform the same process automatically. Another beneficial aspect of the example embodiments, a bot can start up based on user input and it can also start based on customer input such as an email to cancel an order. For example, the bot can monitor email inboxes, perform optical character recognition (OCR) to identify content from documents such as invoices, and the like.

Meanwhile, a process graph (also referred to as a process diagram, etc.) is a visual representation of the business process which includes nodes representing activities or events that are performed during the business process and vertices between the nodes indicating relationships/dependencies between the activities. A process graph may refer to the processing mining result as a "reality check" of what has already happened in the system. A BPMN picture on the other hand is considered an "ideal flow" representation of how the process is supposed to work. As an example, an invoice may have various activities such as creating the invoice, setting a due date for the invoice via a docketing system, modifying the due date via an invoicing system, canceling the invoice or clearing the invoice via an accounting system, etc. The process diagram may include nodes for each of these activities and vertices between the nodes indicating an order in which the activities occur. This information may be mined from historical user interface behavior of a user who is performing tasks associated with the business process. Furthermore, other data mining approaches rely on backend data (i.e., classical processing mining). However, a process diagram is typically an explanation or a model of what has happened already. But the process diagram typically does not provide a user with the ability to access the underlying data associated with the process diagram.

In contrast, the example embodiments are directed to an interactive process graph that allows a user to visualize different activities of a complex business process via a single view on a user interface, and also enter data into different systems/user interface of the business process via the single view. The process graph is not static, but rather fluid/dynamic. Each time the actual execution of the process changes, this is reflected in the process graph. Examples could be new paths appearing or even new activities showing up (for which bots would automatically become available after some observation). Here, the business process may require multiple underlying systems and multiple different user interfaces to complete. However, in the example embodiments, the process graph logically sits above these systems and can be used to abstract away the different user interfaces. Instead, the process graph itself can receive inputs for different activities via entry fields in the activity nodes of the process graph and call a bot program to extract the data from the entry fields in the process graph and replay or otherwise transfer the inputs it into the underlying system(s) without ever opening a user interface of the underlying system(s). As a result, a user does not have to learn or interact with the user interfaces of the different ERP systems. This can significantly reduce the amount of time it takes to perform any activity in the end-to-end process.

FIG. 1A illustrates an architecture 100A of a computing environment for interacting with data and processes via a user interface in accordance with an example embodiment. In FIG. 1A, the architecture 100A includes a user interface layer 110, a process instance layer 130 and a data store layer 140. In this example, a user can interact with an ERP system hosted by a host platform 132 via SAP GUI (windows client) or SAP Fiori App (browser-based) via a user device 112. The interactions on the user interface of the user interface layer 110 when interacting the process instance layer 130 and the data store layer 140 may be recorded. As another example, the user interface layer 110 and the process instance layer 130 and/or the data store layer 140 may be on a single device that does not use a web-based application but rather a legacy or on-prem application.

Figure 1C:
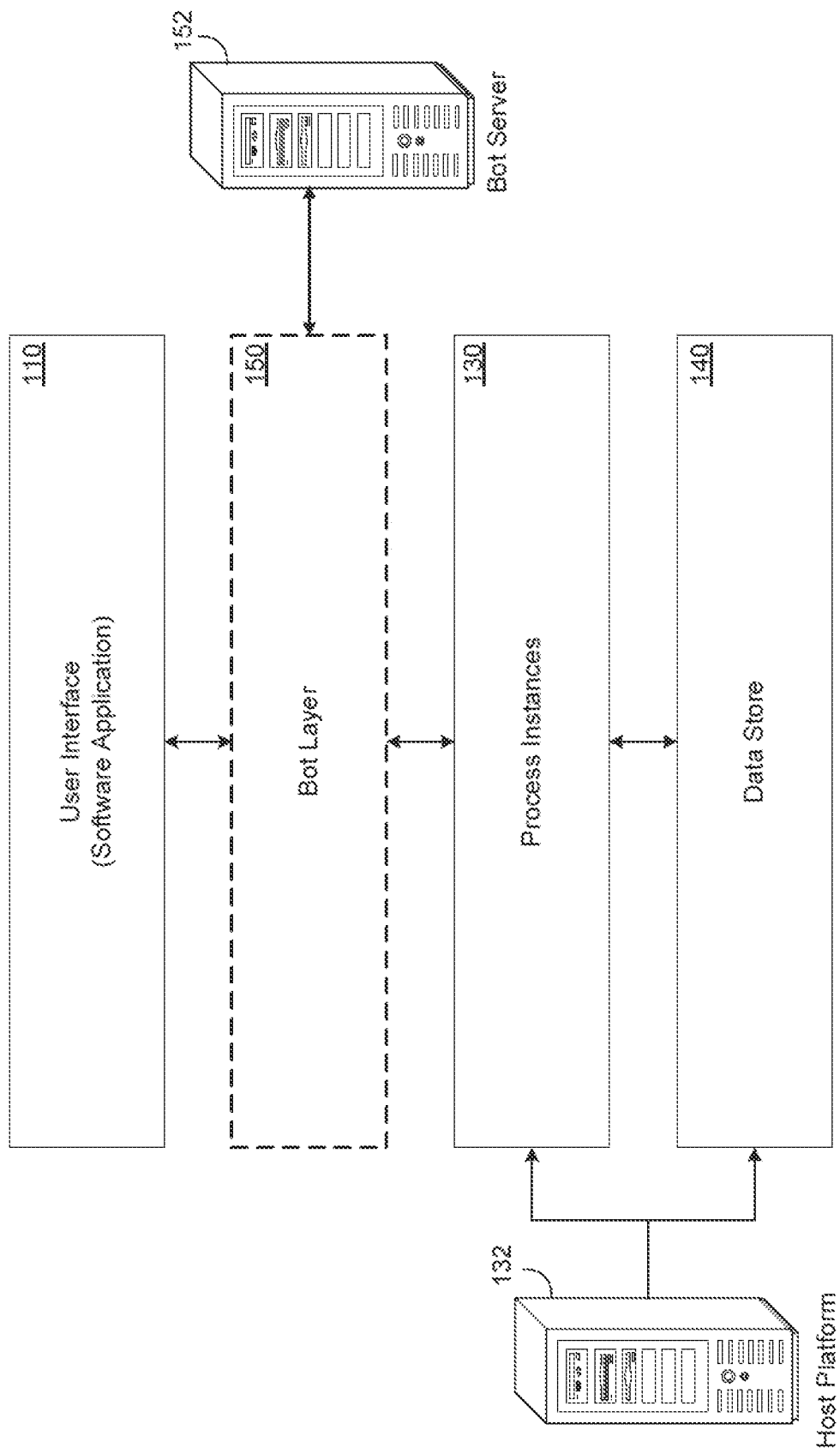
FIG. 1C is a diagram illustrating a computing architecture in which a bot is added based on the mined user behavior in FIG. 1B, in accordance with an example embodiment.

FIG. 1B illustrates an architecture 100B of a computing environment for mining user behavior in accordance with an example embodiment, and FIG. 1C illustrates an architecture 100C of a computing environment in which a bot is added based on mined user behavior, in accordance with an example embodiment. Referring to FIG. 1B, the architecture 100B includes the user interface layer 110, the process instance layer 130, and the data store layer 140. In addition, the architecture 100B also includes a user behavior mining layer 120 hosted by a mining server 122 in this example. For example, the user device 112 may be used to connect to a software application hosted by a host platform 132. In this example, the user interface layer 110 may refer to one or more web-based user interfaces of a web-based software application, such as a web-based Enterprise Resource Planning (ERP) software application. As another example, the user interface layer 110 may refer to legacy or on-prem installations that are accessed locally and not over the web. The software application may include one or more software processes hosted by the host platform 132 and represented by the process instance layer 130 which interact with data stored in a data store of the host platform 132 represented by the data store layer 140.

A user may interact with the process graph described herein via a user interface output via a display of the user device 112. For example, the process graph may represent a multi-stage and/or multi-actor process in which multiple user interfaces and possibly multiple backend endpoints are needed. In this case, the process graph may be generated by the host platform 132 and transmitted to the user device 112 via the Internet such as via an HTTP message. The process graph may be output by the host platform 132 in response to a request via a user interface of the software application displayed on the user device 112. Here, the user device may establish a network connection with the host platform 132 and perform a web-based session such as an HTTP session, etc.

The user behavior mining layer 120 in FIG. 1B refers to information about the user's behavior that may be mined by a mining server 122 from the session between the user device 112 and the host platform 132. For example, user behavior on a user interface displayed on the user device 112 such as mouse clicks, data entered (characters, etc.), time spent on various fields, pages, areas, etc. may be collected and recorded over time. In FIG. 1B, with the introduction of the user behavior mining layer 120, data collected like this may be mined via the mining server 122 and a process graph can be created along w/bots for the observed activities. Furthermore, the interactive process graph (graph+bot invocation fields in activities) may be shown as a "system abstraction" view.

The mined data may be filtered or cleaned such that user-identifying information can be obfuscated or even removed via a plugin such as a client-side or server-side plugin, via a client-side web browser extension, or the like. In addition, content entered in text fields may be tracked because it allows more sophisticated bots to be designed. The content may be recorded "as-is" which allows explicit parameter identification. In some cases, the content may be hashed in a way that still allows for the identification of the input variants. For example, hashing the content can still allow for an identification of attributes of the content such as input variants (e.g., a string can be added to the hash value (e.g., "in this activity, three different unknown inputs were observed and one of them is in 90% of all cases", etc.)

In some embodiments, a bot layer 150 may be introduced or otherwise added to the architecture of FIG. 1B to create the architecture 100C shown in FIG. 1C. For example, an automated bot may be generated based on the user behavior mined from the session(s) between the user interface on the user device 112 and the processes of the software application hosted by the host platform 132. The bot may automate user interface actions such as data entry, opening pages, entering data, and the like. Although not shown in FIG. 1C, it should be appreciated that both the user behavior mining layer 120 shown in FIG. 1B and the bot layer 150 shown in FIG. 1C may be present at the same time, but for purposes of convenience are shown separately here.

In some embodiments, the bot may also perform various CRUD activities with respect to the data store of the host platform 132 which hosts the application data. Here, CRUD refers to creating, reading, updating, and deleting data records/items stored in the data store. The bot may be generated by a bot server 152 which analyzes the user behavior and automatically identifies a bot that can optimize the performance of the process. For example, the bot server 152 may generate and analyze metrics associated with user performance and create or otherwise provide a development environment where a bot program can be built. The bot creation process may be automated.

As noted above though, a bot program still requires a user to open a user interface and input data at each state of the process. Therefore, a user must learn and understand how to interact with the various user interfaces. For ERP systems, the user interfaces can be clunky and cumbersome to learn. These systems are designed for many purposes and often have significantly more features than are necessary for a particular task.

To address the above-noted problems, the example embodiments are directed to a software application that creates a process graph of an end-to-end process of a data object as it moves through a complex business process. The end-to-end process may involve multiple back-end systems, multiple users, multiple user interfaces and the like. Furthermore, in addition to providing a view of the end-to-end process of the data object as it moves through a complex business process, the process graph is also interactive. Here the process graph allows a viewer/user to interact directly with multiple back-end systems from the process graph itself without the user needing to visit or even open any user interfaces of the underlying back-end systems. In particular, the process graph software application can see the network traffic between the client and the server, and can therefore generate an API request/call directly with no need for a bot. Furthermore, bots can be programmed to extract data from a field within the process graph (or within a field of a node of the process graph) and write or otherwise interact with a data record, table, blob, etc. of the field in the underlying back-end system.

Furthermore, the interactive process graph can also track a current location of the data object as it moves through the end-to-end process. As an example, a data object may be a business document or business object such as a sales order, an invoice, or the like. Therefore, the status of the data object can be preserved and viewed at any time via the process graph. Accordingly, the process graph may be used as a central view for expediting the process instances in multiple possible ways which typically requires multiple user interfaces. However, in the present application, the only user interface required is the interactive process graph which provides a central view for interacting with active process instances which are already running by updating information in multiple back-end systems which are associated with the active process instances. Therefore, a user does not need to open or access the user interfaces of the underlying back-end systems.

As an example, activities to be performed within the end-to-end process may be displayed as nodes (also referred to as activity nodes, etc.) in the process graph. Furthermore, the nodes may be connected with vertices having directions/arrows indicating dependencies amongst the activities. A marker or an indicator may be displayed within the process graph which provides a current location/status of the data object in the end-to-end process. In particular, additional nodes or "places" can be added to the process graph which allow the identifier of the data object to be held similar to a waiting area. Here, the identifier of the data object may be dragged via drag-and-drop commands on the user interface and moved around in the process manually by the user to correspond to actual actions taken. Here, petri net semantics can be used to place restrictions on the movement of the marker within the process graph. For example, if the marker refers to a business document, the petri net semantics may prevent the marker (business document) from being dragged to any activity node or place on the screen but could only be dragged to a next connected activity node or place to ensure an expected continuity of the process along historically validated paths.

As another example, the host platform may automatically move the identifier of the data object to move within the process graph based on data that is entered via the process graph. For example, the host platform may detect that the user has submitted all required mandatory fields in a first activity for the data object (e.g., input a mandatory data field value in a document, etc.) and move the identifier of the data object from a node corresponding to the first activity to a node corresponding to next activity in the process with respect to the first activity.

Figure 2A:
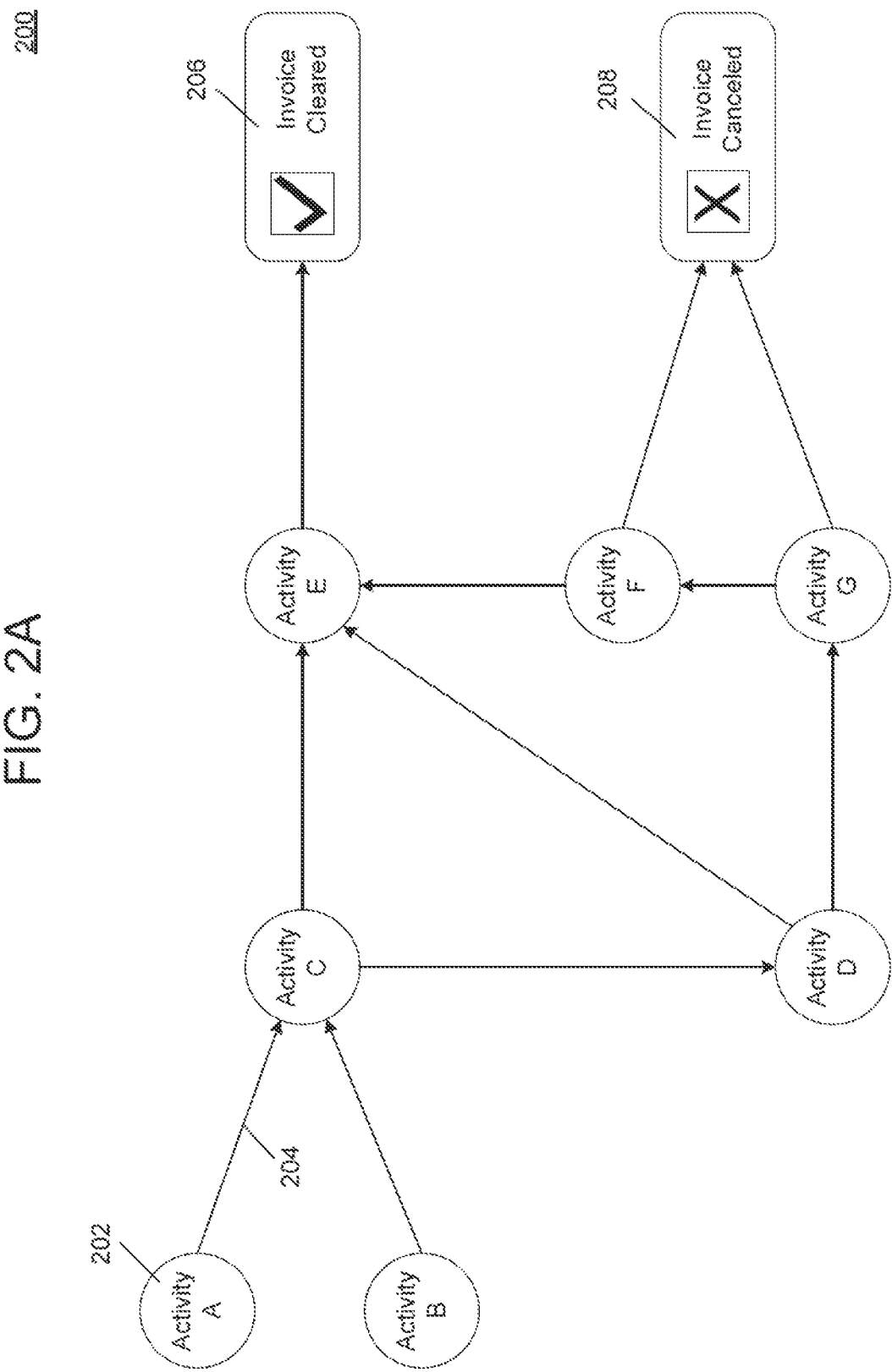
FIGS. 2A-2D are diagrams illustrating a process of generating an interactive process graph in accordance with example embodiments.
Figure 2B:
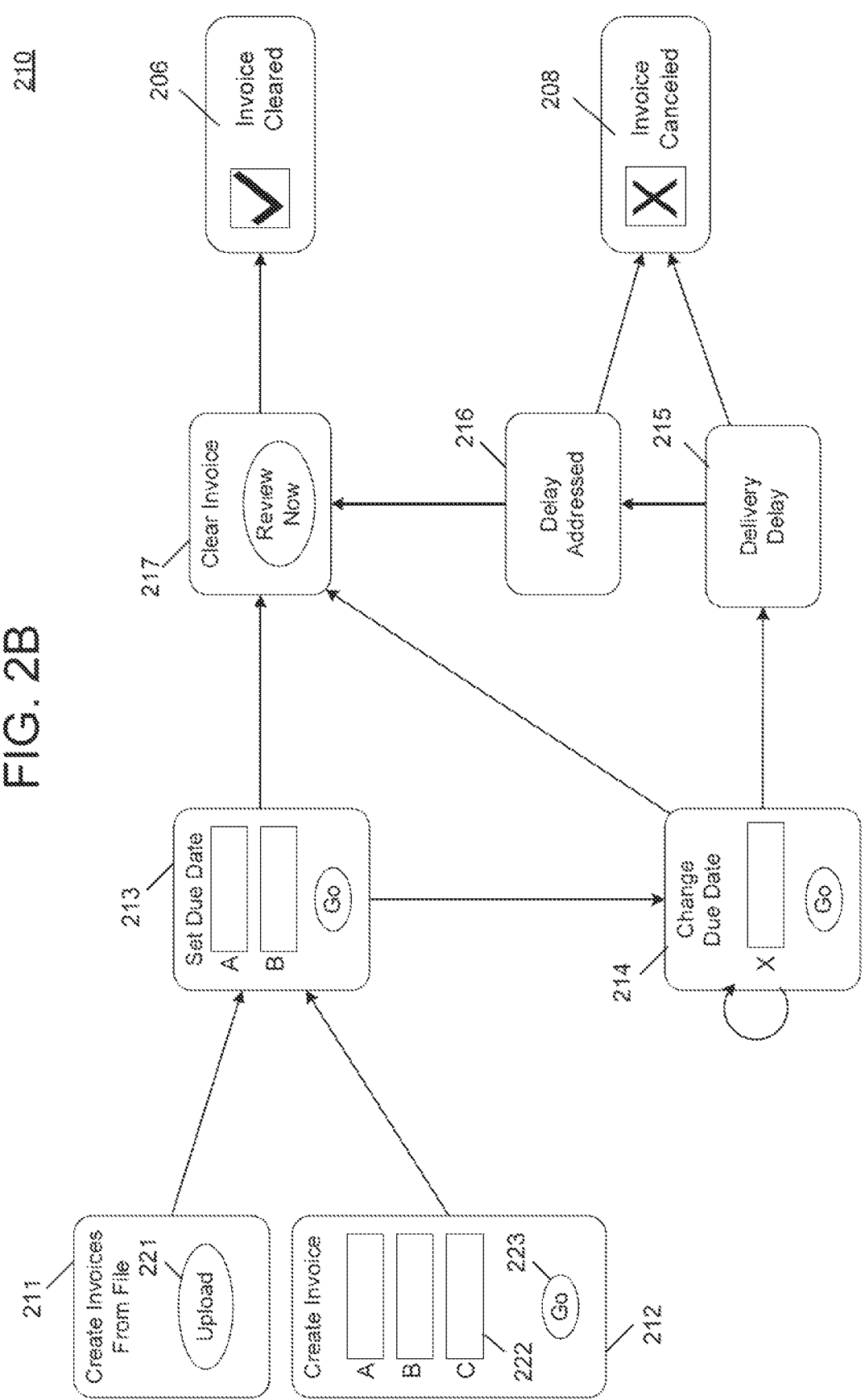
Figure 2C:
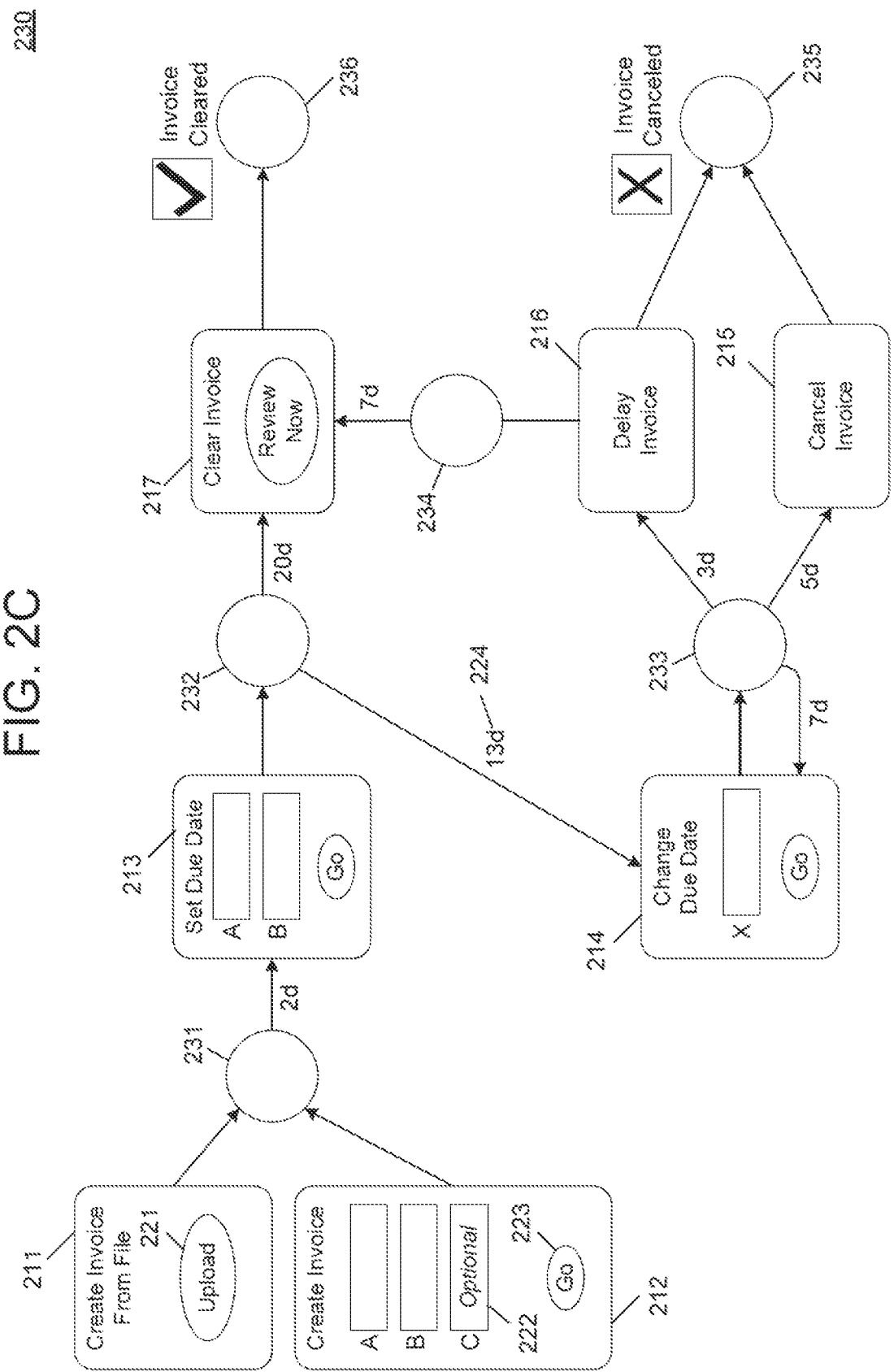

FIGS. 2A-2C illustrate a process of generating an interactive process graph in accordance with example embodiments. For example, FIG. 2A illustrates a process 200 of creating an initial process graph. Here, the host platform or mining server mines the user behavior on a user interface (e.g., while the user is interacting with a particular business process hosted by the host platform). Here, this is not restricted to the end user behavior we get from the UI, but it also could incorporate back-end related process mining data as well. For example, the host platform may analyze the mined data using various metrics to build a process graph, for example, as described in U.S. Pat. No. 10,812,627, issued on Oct. 20, 2020, which is incorporated herein by reference for all purposes. Furthermore, the host platform may analyze the mined data to identify processes or tasks performed on the user interface that can be automated and create a bot for automating such tasks, for example, as described in U.S. Pat. No. 10,977,058, issued on Apr. 13, 2021, which is incorporated herein for all purposes.

In FIG. 2A, the process graph includes a plurality of nodes 202 which correspond to a plurality of activities (i.e., Activities A-G) that are repeatedly performed when performing a particular multi-user interface process such as over the lifetime of a document such as an invoice. In this example, the activities refer to activities associated with transitions or events in the process that require a user involvement. In FIG. 2A, the plurality of nodes 202 are connected by vertices 204 that include directional arrows providing for the relationships among the activities represented by the nodes.

In some embodiments, the process graph may include multiple "paths" there within. Over time, the complete state space of the process may be observed and mapped based on the mined user data. Every state the process can be in during its execution and all the different activities that have been observed in their varying frequencies in these states are combined into the process graph. Although not shown in FIG. 2A, based on the process graph, a heatmap-like indication of anomalies may be generated (e.g., indications of where a lot of rework happens to indicate where the customer should invest money and effort to investigate and solve the underlying issue). Process mining can only tell you what happened and when. In this example, the process graph obtains the time it takes to execute the tasks therefore enabling the process graph to know how long the task took and how it was done. Furthermore, a bot can be generated to automate a task that requires a significant amount of work on the user's part via the user interface. Furthermore, the final nodes in the process graph may include nodes 206 and 208 which correspond to different endings in the respective paths.

FIG. 2B illustrates a process 210 of embedding user interface fields into nodes of the process graph of FIG. 2A.

Referring to FIG. 2B, the process graph may be displayed such that the nodes 202 (empty circles) are replaced with node modules 211, 212, 213, 214, 215, 216, and 217 with content therein. In this example, the node modules 211, 212, 213, 214, and 217 are "interactive." The node modules corresponding to "activities" or activity nodes within the process graph. In particular, the host platform may detect the input fields of a user interface of an underlying system that are associated with each activity and display those within a node module that corresponds to that activity. Here, the input fields may correspond to fields of a user interface of an underlying system where data is to be interacted with and the fields may be embedded within (i.e., inside) the node structures on the process graph. It should also be appreciated that the input fields may be located at other areas of the process graph and not necessarily inside the nodes but rather partially inside/partially overlapping the nodes or not inside the nodes at all. The input fields may be learned from the mined user behavior. In addition, which fields are optional and which fields are mandatory may also be learned from the mined user behavior (e.g., fields that are always filled in versus fields that are not, etc.) For example, data values entered, mouse clicks, cursor positions, time spent data, etc. may be analyzed to identify which fields the user inputs data into on which screens/pages of the different user interfaces.

In the example embodiments, the input fields are associated with automated bots. In particular, each interactive node module may include a bot that performs an automated task in response to the interaction with the elements on the process graph. For example, an upload button 221 may allow a user to upload hundreds of invoices via a corresponding CSV file or other document from a particular storage location. Here, the bot may grab the file and create corresponding new records in the underlying system. Meanwhile, a go button 223 may be selected once the user has entered data into input fields of the node module 212. In this example, input field 222 (i.e., input field C) is marked as optional among the input fields A, B, and C. In response, the host platform may execute a bot program to extract the content entered into the input fields 222 of the node module 212 in the process graph and write or otherwise send the content to an underlying data system such as a database thereby writing the data or modifying the data in the underlying data system in an automated manner directly from the process graph and without a need to open a user interface and input the data.

The process graph in the example embodiments is similar to a command center. The process graph does not include trackers or bots that are active on it. Rather, trackers on an ERP user interface deliver data which allows the software described herein to generate such a process graph after, e.g., observing how an invoice is created manually in the ERP (e.g., node module 212). Bots capable of covering the UI usage seen in the ERP can be generated from this data (i.e., we have a bot definition of how the node module 212 can be executed if input values for fields A+B+C are provided). The process graph in FIG. 2C shows how the process usually looks like, adds In the current state of the running instances, and allows users to trigger the bots covering the ERP functionality. For example, the fields A, B, and C in the node module 212 can be used as a parameter for the underlying bot which is invoked when the user presses the go button 223.

FIG. 2C illustrates a process 230 of embedding places 231, 232, 233, 234, 235, and 236 into the process graph. Here, the places 231-236 refer to locations in the process graph where a visual indicator of the data object being modified by the process can sit and wait while waiting for the next activity to be completed. In addition, the process graph may trigger a change of the place of a data object/business object based on an explicit user action, an external event integrated into the system (e.g., automated cancellation if a user cancels an order in her order overview) or time-based events such as a payment date becoming past-due. Each activity that includes a user interface input may include a respective place for holding data objects as inputs and, once executed, as outputs based on petri net semantics. In some cases, each place may hold multiple data objects (corresponding to multiple invoices, documents, etc.). Furthermore, the vertices are modified such that a data object path includes the places as well as the nodes. Thus, the identifier of the object may be displayed at a place in the process graph where the data object currently is in the multi-UI process being executed. In addition, timing information 224 may be added on the edges of the process graph. In FIG. 2C, the timing information can be used to identify how long a business object sits between steps in the process graph.

Figure 2D:
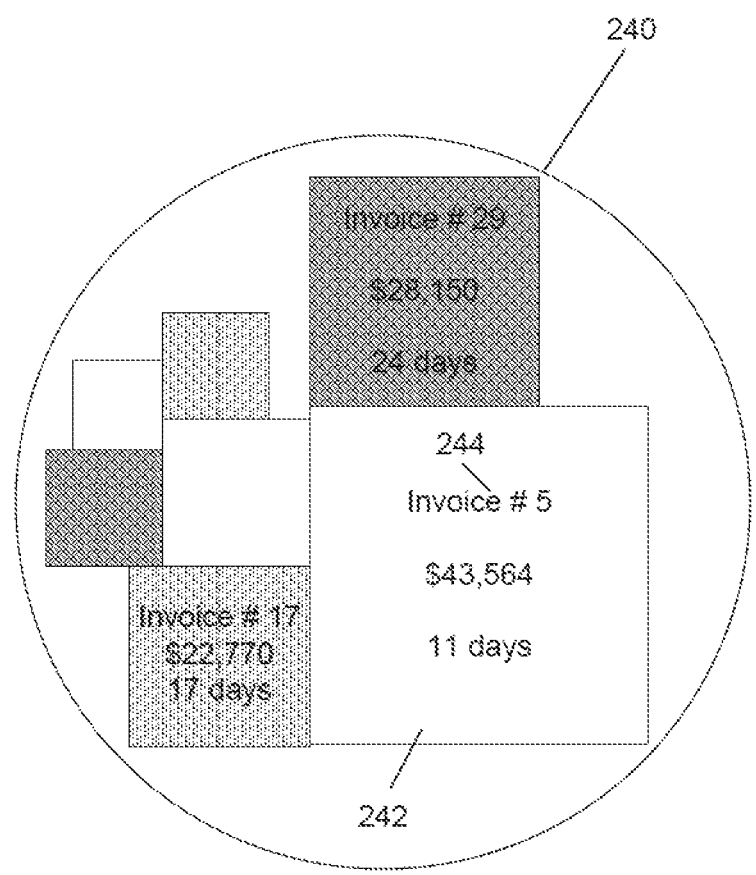

For example, FIG. 2D illustrates an example of a place 240 that may be representative of any of the places 231-236 shown in FIG. 2C. Here, each data object may be represented by a graphical object 242 that identifies the data object and which includes content 244 inside the graphical object 242 providing additional details of the data object, the process, etc. In some embodiments, a size and a color of each data object may be modifiable or otherwise dynamically set based on various attributes of the process in which the respective data object is in. For example, a size of the data object may be used to represent a total amount owed or a total quantity, etc., while a color of the data object may be used to represent an urgency. For example, a data object that is red in color may be over 20 days old (e.g., upper/worst tercile of how long invoices stay at this place, etc.) while a data object in yellow may be a data object that is 10-19 days old (e.g., mid tercile, etc.), while a data object that is green in color may be less than 10 days old (e.g., lowest/best tercile, etc.)

Figure 3A:
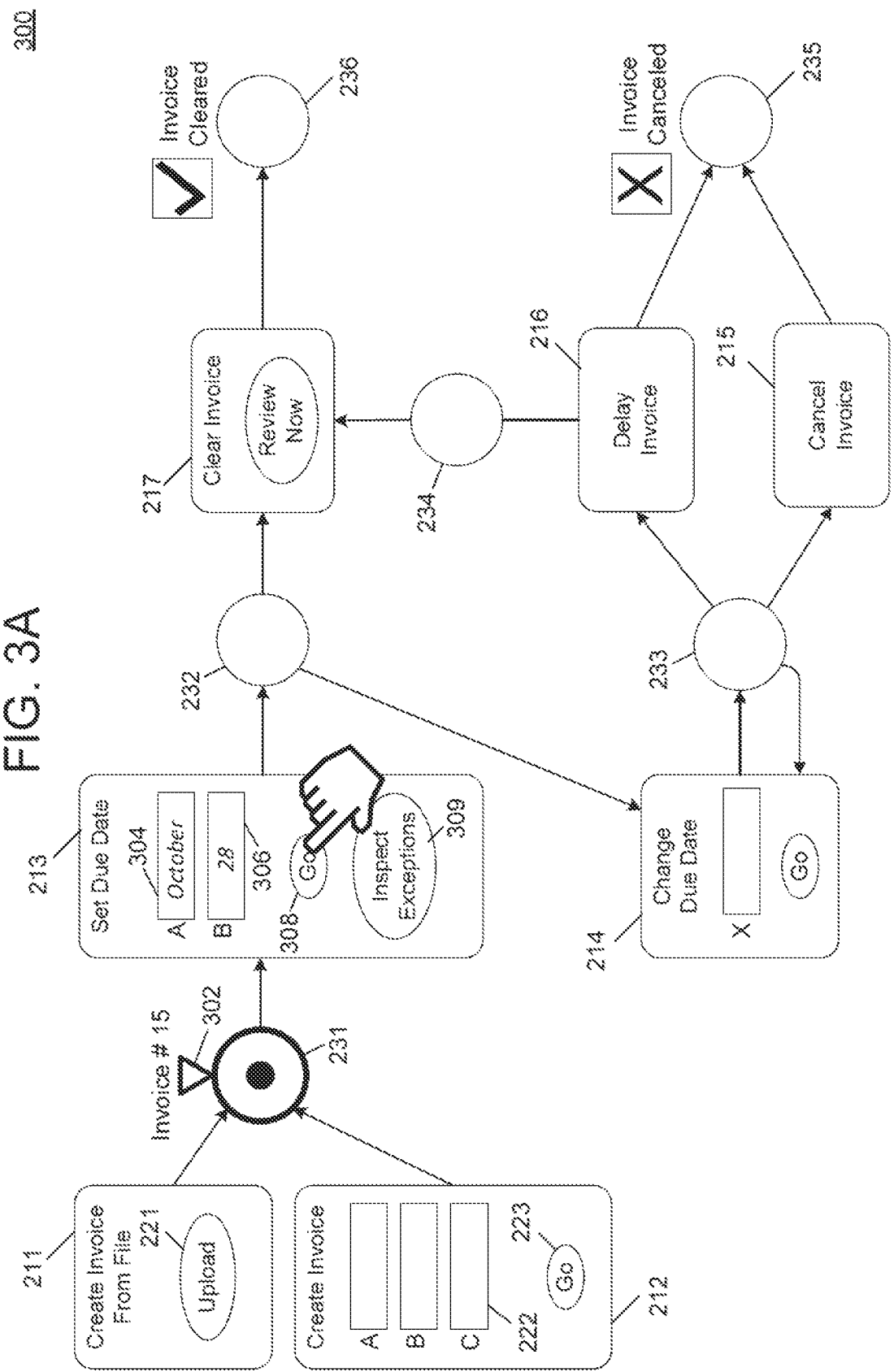
FIGS. 3A-3C are diagrams illustrating a process of interacting with an interactive process graph in accordance with example embodiments.
Figure 3B:
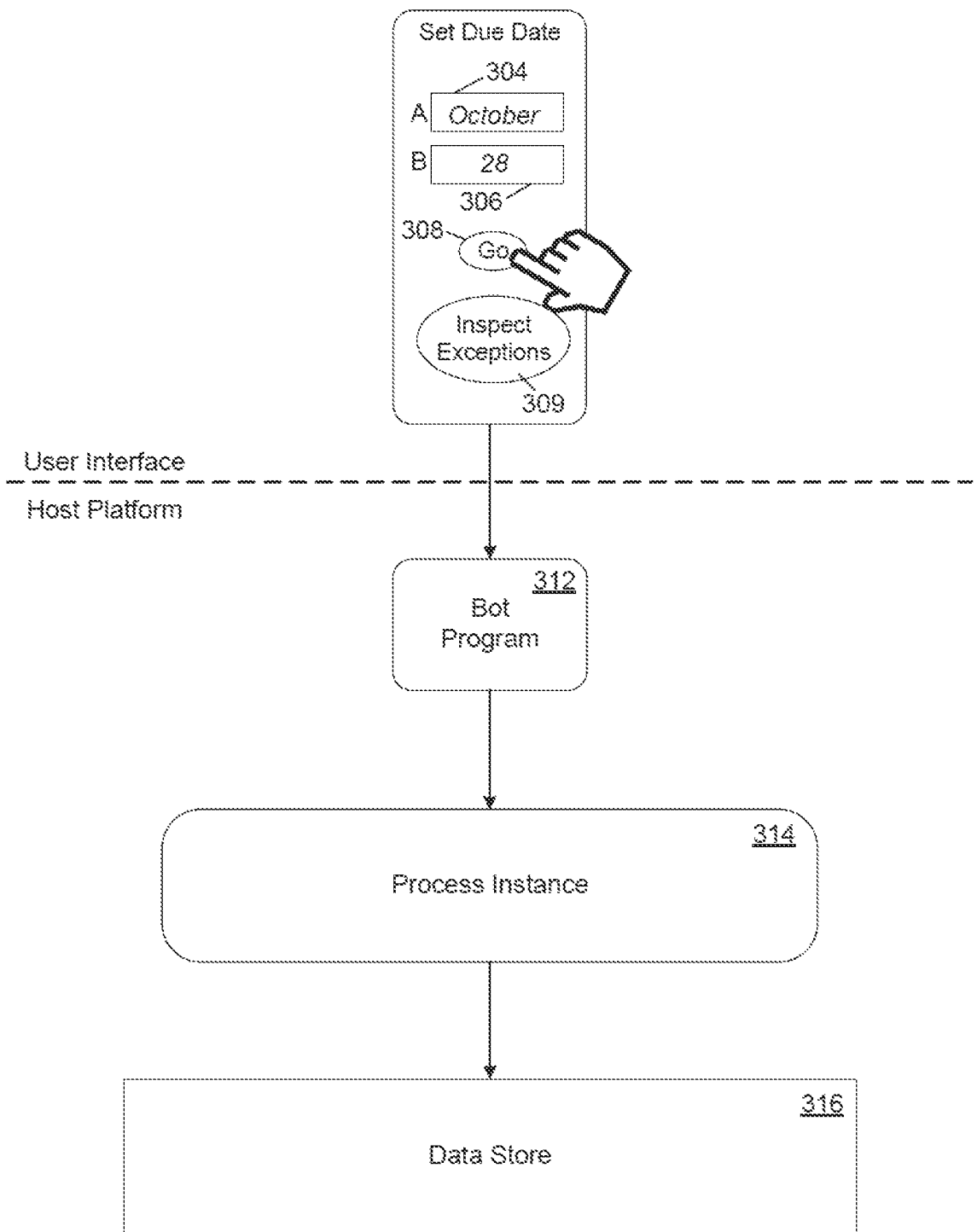
Figure 3C:
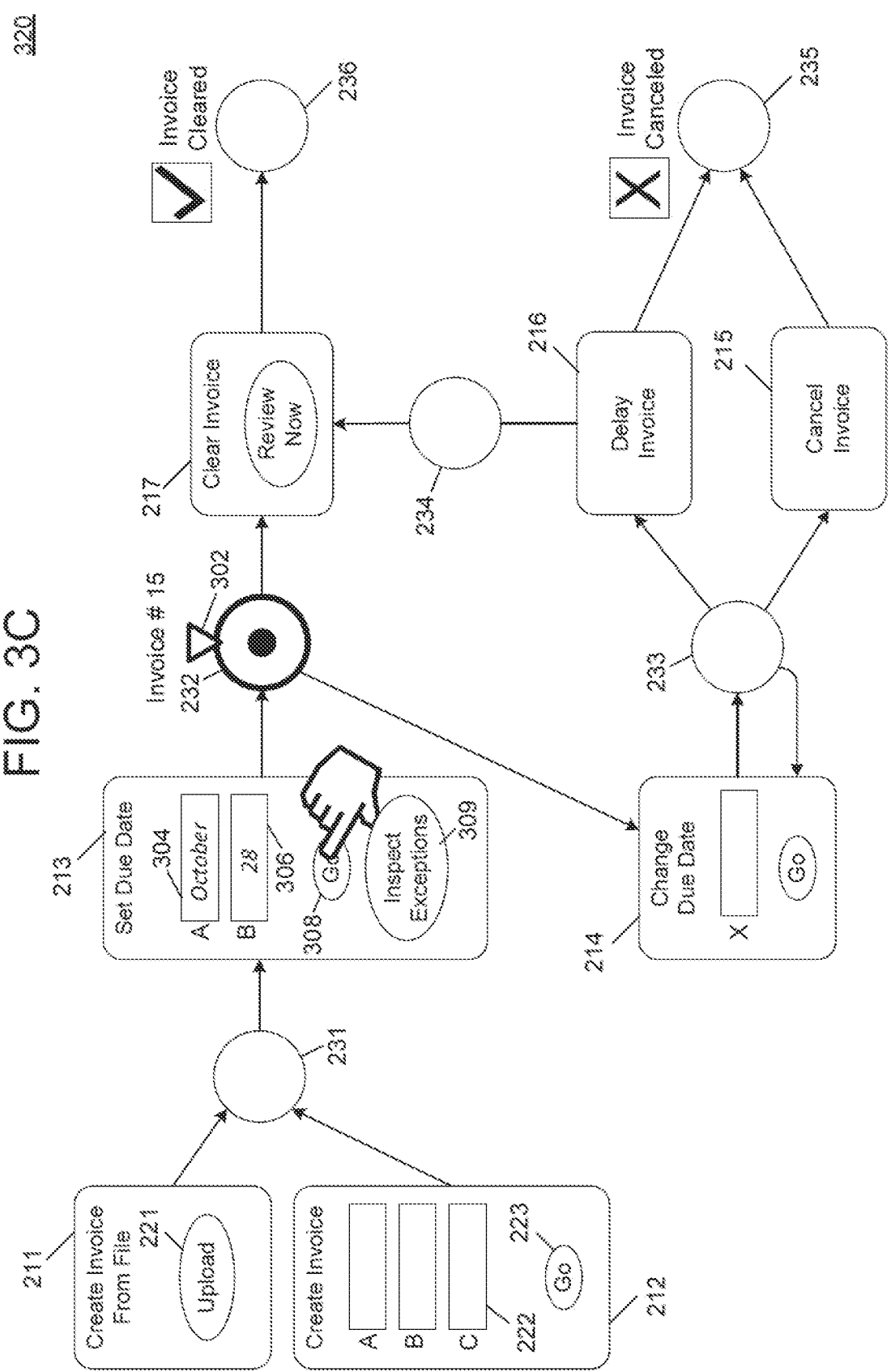

FIGS. 3A-3C illustrate a process of interacting with an interactive process graph in accordance with example embodiments. For example, FIG. 3A illustrates a process 300 of displaying an identifier of a current location of a data object (e.g., an invoice, etc.) within a process that requires more than one user interface such as a multi-system and/or multi-party process. Here, an indicator 302 is displayed at the place 231 which indicates that the process is waiting for a due date to be set for the invoice. The indicator 302 may include an additional graphical user interface object, icon, image, bolded lines/nodes, insertion of a dot or other object inside of a place, etc. In this case, the place 231 is positioned prior to the node module 213 corresponding to the set due date activity and the outer border of the place 231 is bolded and a dot is added inside the place to indicate that the place 231 is occupied by the data object. Furthermore, the node module 213 includes input fields 304 and 306 of data to be entered and submitted to an underlying system by that activity. The input fields 304 and 306 may have any desired format, size, shape, etc. The host platform may know which input fields to display in which node structures based on the mined user behavior data.

In FIG. 3A, the user enters content (string values/characters) into the input fields 304 and 306 which are needed to set the due date of the data object and enters the content to the underlying system by pressing a go button 308. In response the go button 308 being pressed, the host platform calls a bot program 312 as shown in a process 310 of FIG. 3B which receives the data from the input fields 304 and 306 as parameters of the bot program and sends it to a process instance 314 of an underlying system (e.g., data store 316) for modifying a data record of the data object stored in the data store 316 with the content stored in the input fields 304 and 306. In this example, the bot may either work via UI, replaying the clicks observed before and the new input values for this instance, or an API call can be generated and sent taking care of this (done for some ERP systems), or the bot tries to get this closer to the DB level (might be applicable for some other systems).

Meanwhile, FIG. 3C illustrates a process 320 which includes a response from the host platform when the user presses the go button 308 within the process graph of FIG. 3A. Here, the host platform causes the indicator 302 to move to a place 232 which is next in the process graph and wait for the process to catch-up and execute that activity. Furthermore, as shown in FIGS. 3A-3C, the node module 213 includes a button 309 for inspecting exceptions. This ensures that the UI does not promise success before it is actually achieved. Here, a user may select the button 309 to view and potentially resolve any currently pending exceptions. In this example, the place 232 is positioned in front of the node module 214 that corresponds to a multi-path decision in the process graph. Here, the process may advance to a clearing of the invoice at the node module 217 along a first path (e.g., where the customer pays the invoice and is cleared directly) or a change of the due date at the node module 214 along a second path (e.g., where the customer asks for postponement of the due date). The user may drag the indicator 302 to the next place it desires using a cursor or pointer such as a mouse or finger. For example, the user may drag the indicator 302 to the node module 214 and input data into the input fields in the node module of the node module 214. Once the GO button is clicked and the changes have been successfully committed, the system will move the indicator to place 233. As another option, the user may click on the "review now" button in node module 217, and the host platform will automatically check if the expected amount has been paid by the customer. If so, the system may move the indicator 302 to a place 236 within the process graph based on the dependencies among the activities.

Figure 4:
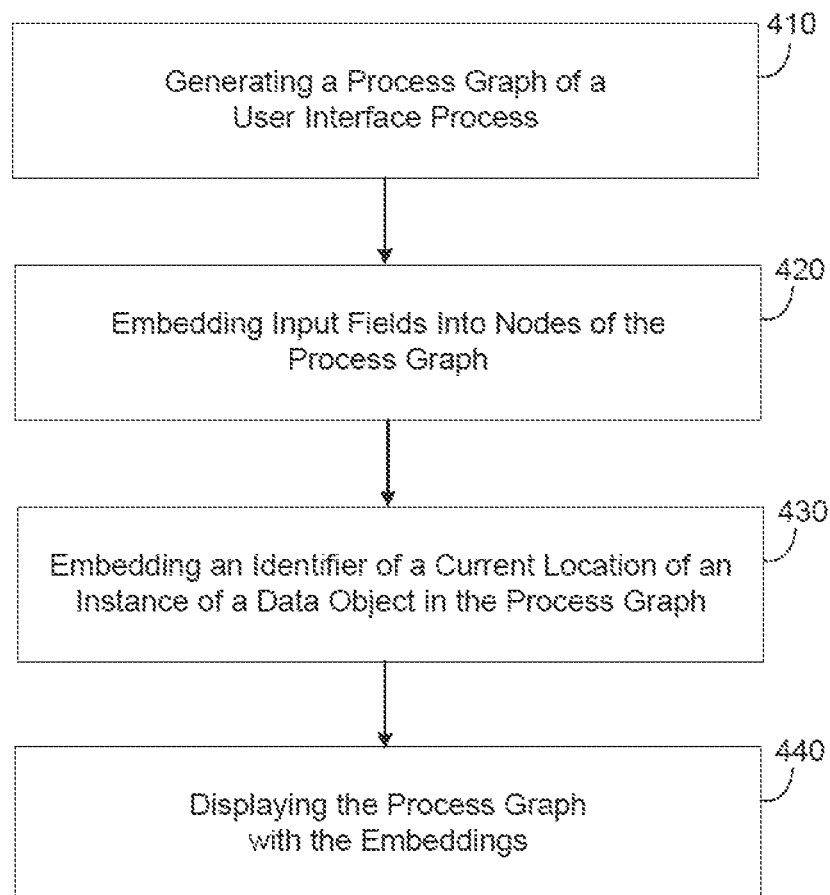
FIG. 4 is a diagram illustrating a method of managing an interactive process graph in accordance with an example embodiment.

FIG. 4 illustrates a method 400 of managing an interactive process graph in accordance with an example embodiment. As an example, the method 400 may be performed by a cloud platform, a web server, an on-premises server, a user device, a database, a combination of devices, and the like. Referring to FIG. 4, in 410, the method may include generating a process graph of a user interface process, wherein the process graph comprises nodes corresponding to activities performed via the user interface process and vertices between the nodes identifying dependencies among the activities. The process graph may be used to represent a multi-threaded/multi-system business process that traditionally involves data to be entered into multiple user interfaces of multiple systems.

In 420, the method may include embedding input fields in the nodes of the process graph. Here, the nodes may be large enough to include text fields and other content inside an outer boundary of the nodes. In 430, the method may include embedding, via the process graph, an identifier of a current location of a data object within an instance within the user interface process. Furthermore, the process graph may be scaled to include many different instances of many different data objects via the same process graph. In 440, the method may include displaying an instance of the process graph corresponding to the instance of the user interface process which includes the embedded input fields in the nodes and the identifiers of the current locations of the data objects within the instances of the user interface process. In some embodiments, the display may include only the portions of the process that are relevant to the user's decision and not the entire end-to-end process graph.

In some embodiments, the method may further include executing a bot program which receives data from an input field within a node of the process graph and the bot takes the data and interacts with an underlying system. For example, values within the fields of an activity node in the process graph can be used as a parameters for the underlying bot which is invoked when the user presses a go button, or the like. In some embodiments, the method may further include logging the bot program into the underlying system prior to displaying the instance of the process graph.

In some embodiments, embedding the identifier of the current location may include embedding a plurality of waiting areas between the nodes within the process graph, where the plurality of waiting areas correspond to a plurality of state transitions in the user interface process. As an example, embedding the identifier of the current location further may include displaying the identifier of the current location of the data object within a waiting area embedded in the process graph. As another example, embedding the identifier of the current location may further include automatically moving the identifier of the current location of the data object to a next waiting area within the process graph in response to entry of data entered via an input field of a node that precedes the next waiting area.

In some embodiments, the method may further include detecting a drag input on the user interface via a user input mechanism which pulls the identifier of the current location of the data object to a different node in the process graph, and in response, displaying the identifier of the current location of the data object at the different node in the process graph. In some embodiments, the method may further include monitoring an amount of time the identifier of the current location of the data object sits at the current location, and changing a color of the identifier in response to the amount of time exceeding a predetermined threshold of time, a dynamically computed threshold of time, and the like.

Figure 5:
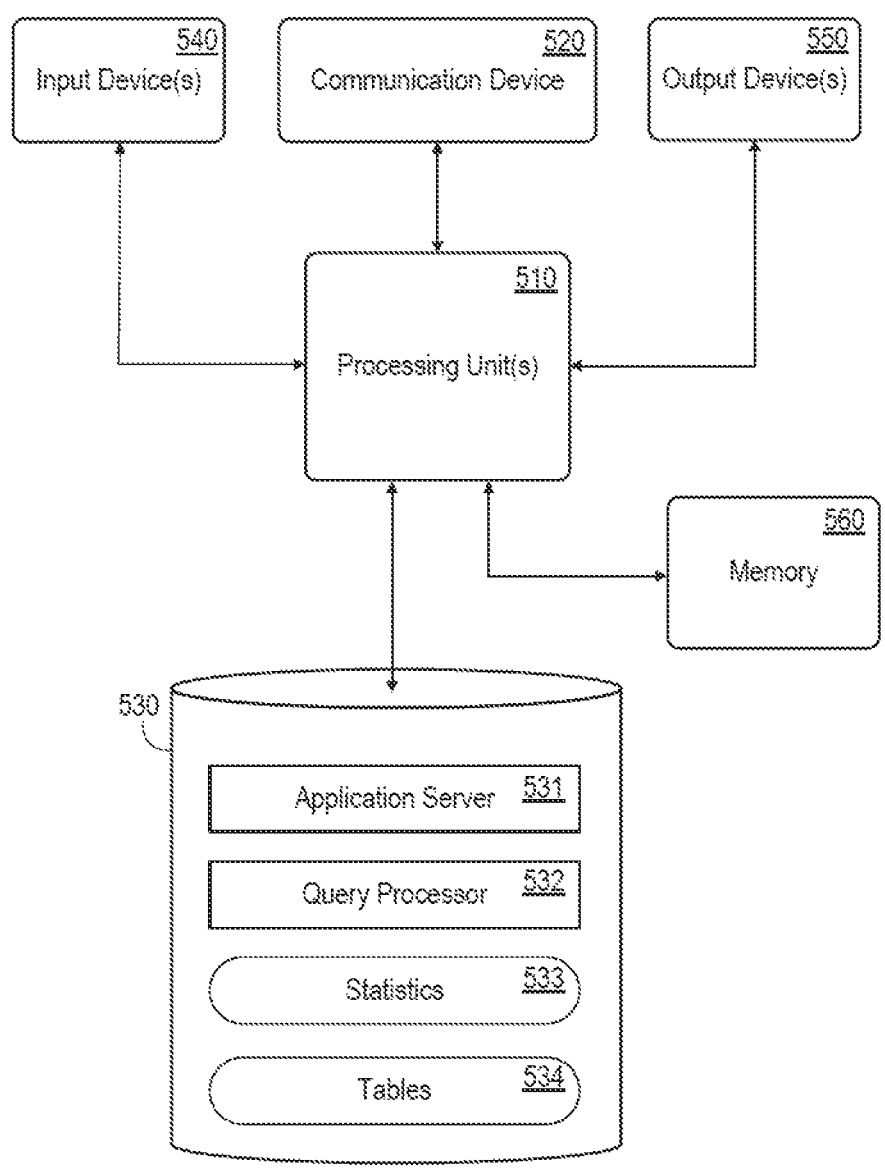
FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 5 is a diagram of a server node 500 according to some embodiments. The server node 500 may include a general-purpose computing apparatus and may execute program code to perform any of the functions described herein. The server node 500 may comprise an implementation of a remote terminal or a host platform, in some embodiments. It should also be appreciated that the server node 500 may include other unshown elements according to some embodiments and may not include all of the elements shown in FIG. 5. The server node 500 may perform the method 400 shown in FIG. 4.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM). In some embodiments, the data storage device 530 may store user interface elements in tabular form. For example, one or more columns and one or more rows of user interface elements may be displayed in a two-dimensional spreadsheet, table, document, digital structure, or the like.

Application server 531 and query processor 532 may each comprise program code executed by processing unit(s) 510 to cause server node 500 to perform any one or more of the processes described herein. Such processes may include estimating a selectivity of a query on tables 534 based on statistics 533. Embodiments are not limited to execution of these processes by a single computing device. Data storage device 530 may also store data and other program code for providing additional functionality and/or which are necessary for operation of server node 500, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
observe user interface behavior of a plurality of users of a software application during multiple executions of the software application, wherein the user interface behavior comprises one or more of clicks, data entry inputs, and time spent with respect to different fields on a graphical user interface (GUI) of the software application which interact with different back-end systems, respectively,
identify a plurality of activities that are repeated by the plurality of users, respectively, based on the observed user interface behavior,
generate a process diagram of the plurality of activities, wherein the process diagram comprises a plurality of nodes corresponding to the plurality of activities and vertices between the plurality of nodes identifying dependencies among the plurality of activities,
embed a first set of GUI input fields for submitting data to a first back-end system into a first node within the process diagram and embed a second set of GUI input fields from a different user interface for submitting data to a second back-end system which is different than the first back-end system into a second node within the process diagram, and display the process diagram,
detect a command input via the process diagram;
in response to the detected input command, call one or more bots to extract first input data from the first set of GUI input fields in the process diagram and write it to the first back-end system and to extract second input data from the second set of GUI input fields in the process diagram and write it to the second back-end system; and
extract the first input data and the second input data from the first and second sets of GUI input fields in the process diagram and write them to the first and second back-end systems, respectively, via execution of the one or more bots.

2. The computing system of claim 1, wherein the plurality of activities are displayed as a plurality of nodes within the process diagram, respectively, and the vertices define execution paths between the activities within the software application.

3. The computing system of claim 1, wherein the processor is configured to simultaneously display multiple identifiers of current locations of multiple data objects within the process diagram.

4. The computing system of claim 1, wherein the processor is configured to embed a plurality of waiting areas between the nodes within the process diagram, where the plurality of waiting areas correspond to a plurality of state transitions of the process.

5. The computing system of claim 4, wherein the processor is configured to identify a current location of a data object within an instance of the process and display an identifier of the current location of the data object within a waiting area embedded in the process diagram.

6. The computing system of claim 5, wherein the processor is configured to automatically move an identifier of the current location of the data object to a next waiting area within the process diagram in response to data being submitted via an input field of a node that precedes the next waiting area within the process diagram.

7. The computing system of claim 5, wherein the processor is further configured to detect a drag input on the process diagram via a user input mechanism which pulls the identifier of the current location of the data object to a different node in the process diagram, and in response, display the identifier of the current location of the data object at the different node in the process diagram.

8. The computing system of claim 1, wherein the processor is further configured to monitor an amount of time a data object sits at a current location within the process diagram during execution of the software application, and change a color of the identifier in response to the amount of time exceeding one or more of a predetermined threshold of time and a dynamically computed threshold of time.

9. A method comprising:
observing user interface behavior of a plurality of users of a software application during multiple executions of the software application, wherein the user interface behavior comprises one or more of clicks, data entry inputs, and time spent with respect to different fields on a graphical user interface (GUI) of the software application which interact with different back-end systems, respectively;
identifying a plurality of activities that are repeated by the plurality of users, respectively, based on the observed user interface behavior;
generating a process diagram of the plurality of activities, wherein the process diagram comprises a plurality of nodes corresponding to the plurality of activities and vertices between the plurality of nodes identifying dependencies among the plurality of activities;
embedding a first set of GUI input fields for submitting data to a first back-end system into a first node within the process diagram and embed a second set of GUI input fields from a different user interface for submitting data to a second back-end system which is different than the first back-end system into a second node within the process diagram, and display the process diagram;
detecting an input command on the process diagram;
in response to the detected input command, calling one or more bots to extract first input data from the first set of GUI input fields in the process diagram and write it to the first back-end system and to extract second input data from the second set of GUI input fields in the process diagram and write it to the second back-end system; and
extracting the first and second input data from the first and second sets of GUI input fields in the process diagram and writing them to the first and second back-end systems, respectively, via execution of the one or more bots.

10. The method of claim 9, wherein the plurality of activities are displayed as a plurality of nodes within the process diagram, respectively, and the vertices define execution paths between the activities within the software application.

11. The method of claim 10, wherein the method further comprises simultaneously displaying multiple identifiers of current locations of multiple data objects within the process diagram.

12. The method of claim 9, wherein the embedding the identifier of the current location comprises embedding a plurality of waiting areas between the nodes within the process diagram, where the plurality of waiting areas correspond to a plurality of state transitions of the process.

13. The method of claim 12, wherein the embedding the identifier of the current location further comprises identifying a current location of a data object within an instance of the process and displaying the identifier of the current location of the data object within a waiting area embedded in the process diagram.

14. The method of claim 13, wherein the embedding the identifier of the current location further comprises automatically moving the identifier of the current location of the data object to a next waiting area within the process diagram in response to data being submitted via an input field of a node that precedes the next waiting area within the process diagram.

15. The method of claim 13, wherein the method further comprises detecting a drag input on the process diagram via a user input mechanism which pulls the identifier of the current location of the data object to a different node in the process diagram, and in response, displaying the identifier of the current location of the data object at the different node in the process diagram.

16. The method of claim 9, wherein the method further comprises monitoring an amount of time a data object sits at a current location within the process diagram during execution of the software application, and changing a color of the identifier in response to the amount of time exceeding one or more of a predetermined threshold of time and a dynamically computed threshold of time.

17. A non-transitory computer-readable medium comprising instructions which when executed by a processor cause a computer to perform a method comprising:
observing user interface behavior of a plurality of users of a software application during multiple executions of the software application, wherein the user interface behavior comprises one or more of clicks, data entry inputs, and time spent with respect to different fields on a graphical user interface (GUI) of the software application which interact with different back-end systems, respectively;
identifying a plurality of activities that are repeated by the plurality of users, respectively, based on the observed user interface behavior;
generating a process diagram of the plurality of activities, wherein the process diagram comprises a plurality of nodes corresponding to the plurality of activities and vertices between the nodes identifying dependencies among the activities;
embedding a first set of GUI input fields for submitting data to a first back-end system into a first node within the process diagram and embed a second set of GUI input fields from a different user interface for submitting data to a second back-end system which is different than the first back-end system into a second node within the process diagram, and display the process diagram;
detecting an input command on the process diagram;
in response to the detected input command, calling one or more bots to extract first input data from the first set of GUI input fields in the process diagram and write it to the first back-end system and to extract second input data from the second set of GUI input fields in the process diagram and write it to the second back-end system; and extracting the first and second input data from the first and second sets of GUI input fields in the process diagram and writing them to the first and second back-end systems, respectively via execution of the one or more bots.

18. The non-transitory computer-readable medium of claim 17, wherein the plurality of activities are displayed as a plurality of nodes within the process diagram, respectively, and the vertices define execution paths between the activities within the software application.

19. The non-transitory computer-readable medium of claim 17, wherein the embedding the identifier of the current location comprises embedding a plurality of waiting areas between the nodes within the process diagram, where the plurality of waiting areas correspond to a plurality of state transitions of the process.

20. The non-transitory computer-readable medium of claim 19, wherein the embedding the identifier of the current location further comprises identifying a current location of a data object within an instance of the process and displaying the identifier of the current location of the data object within a waiting area embedded in the process diagram.

* * * * *